L. S. CHICHESTER.
Flax Harvester.
No. 9,400.
Patented Nov. 16, 1852.
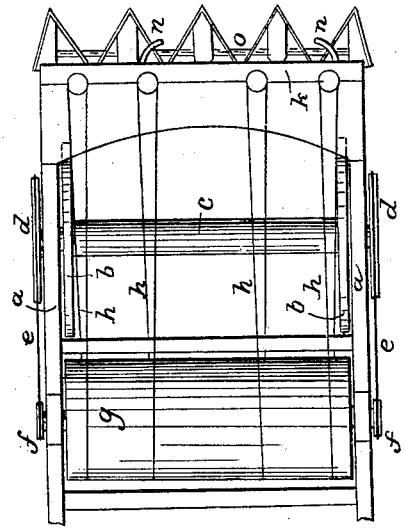
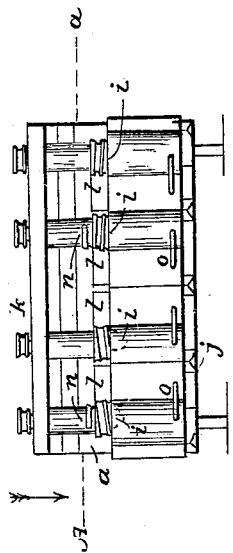
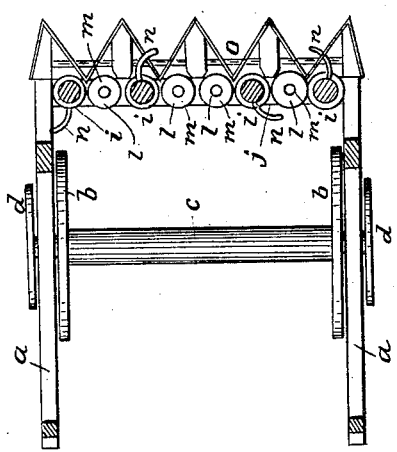
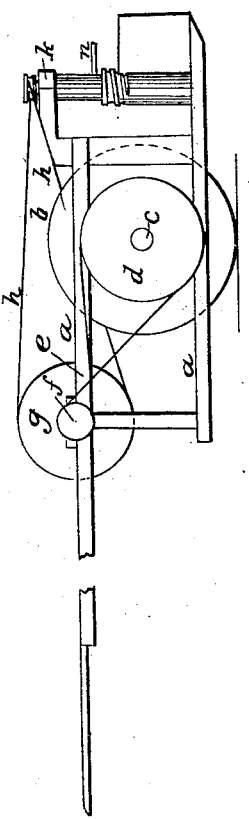

UNITED STATES PATENT OFFICE.

LEWIS S. CHICHESTER, OF BROOKLYN, NEW YORK.

IMPROVEMENT IN FLAX-PULLERS.

Specification forming part of Letters Patent No. 9,400, dated November 16, 1852.

*To all whom it may concern:*

Be it known that I, LEWIS S. CHICHESTER, of Brooklyn, Kings county, New York, have invented a new and useful Machine for Pulling and Gathering Flax; and I do hereby declare that the following is a full, clear, and exact description thereof, reference being had to the accompanying drawings, making part of this specification, in which—

Figure 1 is a plan; Fig. 2, a side elevation; Fig. 3, a front elevation, and Fig. 4 a horizontal section taken at the line A $a$ of Fig. 3.

The same letters indicate like parts in all the figures.

In my said machine there are fingers or wedge-formed projections in front, which pass in between the stalks of flax to divide them and force them together in separate bunches toward pairs of vertical rollers receiving motion by suitable gearing from the wheels on which the machine runs. On one of each pair of rollers there is an arm which by its revolution enters and catches a sufficient number of stalks and draws them toward the bite of the rollers at their upper end, where one of them is formed with a helical groove, or otherwise adapted to receive these stalks and draw them through at the same time and over a horizontal rod or rounded edge placed between the fingers or separators, which act as a fulcrum for the flax, so that as the rollers draw the stalks through they shall be drawn out of the ground by the roots, and when drawn entirely through the stalks are deposited onto the ground, to be collected in any desired manner after the machine has passed.

In the accompanying drawings, $a$ represents a frame, which may be constructed in any suitable manner, and supported on two running-wheels, $b\ b$, of sufficiently wide tread to communicate driving-power to the parts of the machine. These wheels are fixed on an axle, $c$, which at its ends is provided with band-wheels $d\ d$, to receive bands $e\ e$, that pass to pulleys $f\!f$ on the shaft of a barrel or drum, $g$, from which bands $h$ extend to pulleys on the shafts of a series of vertical rollers, $i$. The shafts of these have their bearing at bottom in the front base-piece, $j$, of the frame, and at top in a cross-piece, $k$, both of which are appropriately braced to give the required strength. By the side of each roller $i$ there is a corresponding roller, $l$, turning on a fixed stud, $m$, thus constituting a series of pairs of rollers arranged in a line across the front part of the machine. The rollers $i$ are provided each with a curved arm, $n$, which revolves above the upper end of the rollers $l$, so that as these arms revolve they enter between the stalks of flax, gather a sufficient number of them, and draw them to the bites of the several pairs of rollers; and at the same time the action of these arms will have the effect to bend over the stalks of flax and gather them into the bite of the rollers, the one, $i$, of each pair being formed at the upper end with a helical groove which makes one turn, more or less, for the purpose of more readily receiving the stalks and drawing them down to the bite of the rollers to be drawn through. In front of and situated between the pair of rollers there is a series of wedge-formed fingers or separators, which enter between the stalks and separate them and force them together, to be caught by the curved arms on the shafts of the rollers $i$, to be drawn in; and along the base of these fingers or separators, and passing through them horizontally, there is a round bar, $o$, over which the stalks are bent when drawn in by the rollers, and which, as the machine advances, acts as a traveling fulcrum to draw the flax out of the ground by the roots. After the stalks have been drawn through they are dropped onto the ground.

The machine is pushed forward by a horse or horses harnessed to a pair of shafts, $p$, in the back part of the frame. The machine should advance for each revolution of the rollers $i$ a distance equal to the reach of the curved arms on these rollers, so that between each revolution of these arms the required quantity of stalks shall accumulate.

In front of the bar $o$, and between the fingers or separators, may be placed comb-teeth or scrapers, if desired, to remove the earth of the roots of the flax to prevent it from clogging the rollers in passing through.

Instead of pushing the machine in the manner above described, this may be done in any other suitable manner.

The motion to be communicated to the rollers may be obtained by other means than the band-wheels, at the option of the constructer.

I do not wish to limit myself to the mere matters of construction or arrangement of the parts, as these may be greatly varied within the principle of my invention by the substitution of mere mechanical equivalents.

What I claim as my invention, and desire to secure by Letters Patent for the purpose of pulling and gathering flax, is—

1. The employment of one or more pairs of rollers, substantially as described, in combination with the fingers or separators, or their equivalents, for presenting the stalks to the bite of the rollers, to be drawn in, substantially as described.

2. In combination with the rollers for drawing in the flax, as specified, the employment of the revolving arm or arms for collecting and drawing the stalks to the bite of the rollers, as described.

3. In combination with the rollers for drawing in the stalks, as described, the employment of the fulcrum-bar, substantially as described.

LEWIS S. CHICHESTER.

Witnesses:
WM. A. BISHOP,
CHAS. N. BAMBURGH.